Feb. 22, 1966     C. SHORE     3,236,536
SHOPPING CART
Filed April 17, 1964     3 Sheets-Sheet 2
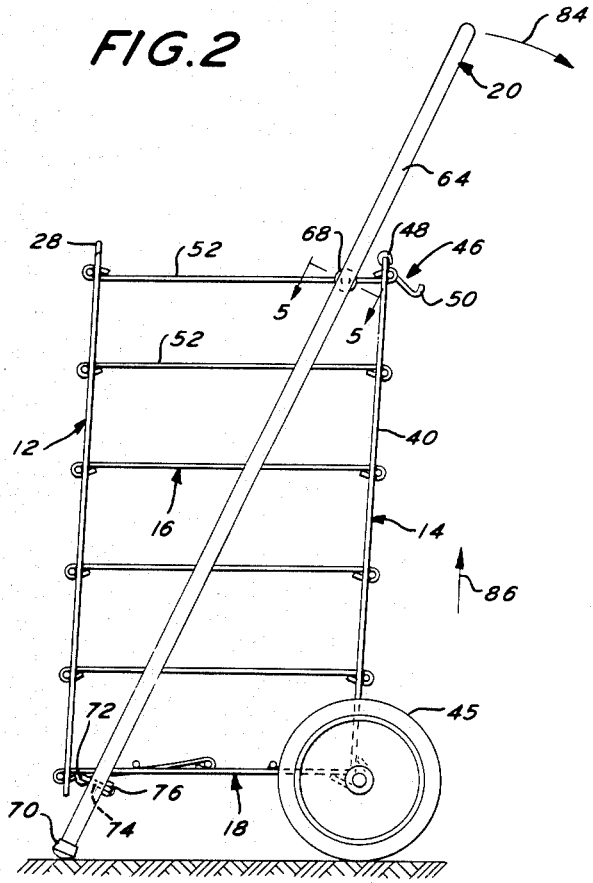
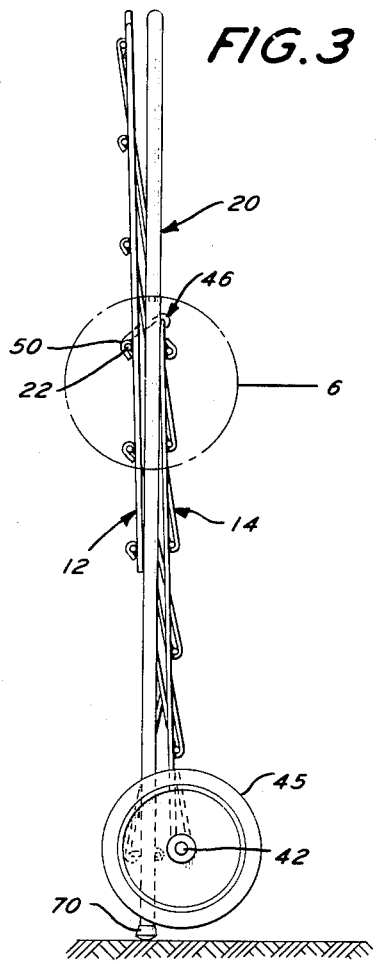
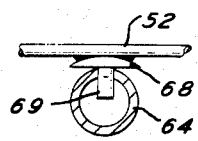
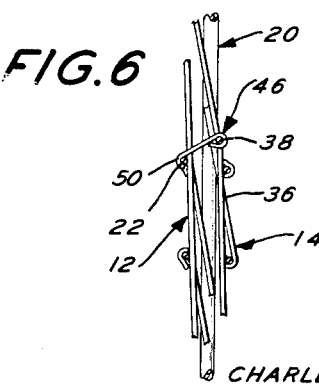
INVENTOR.
CHARLES SHORE
BY
Caesar and Rivise
ATTORNEYS.

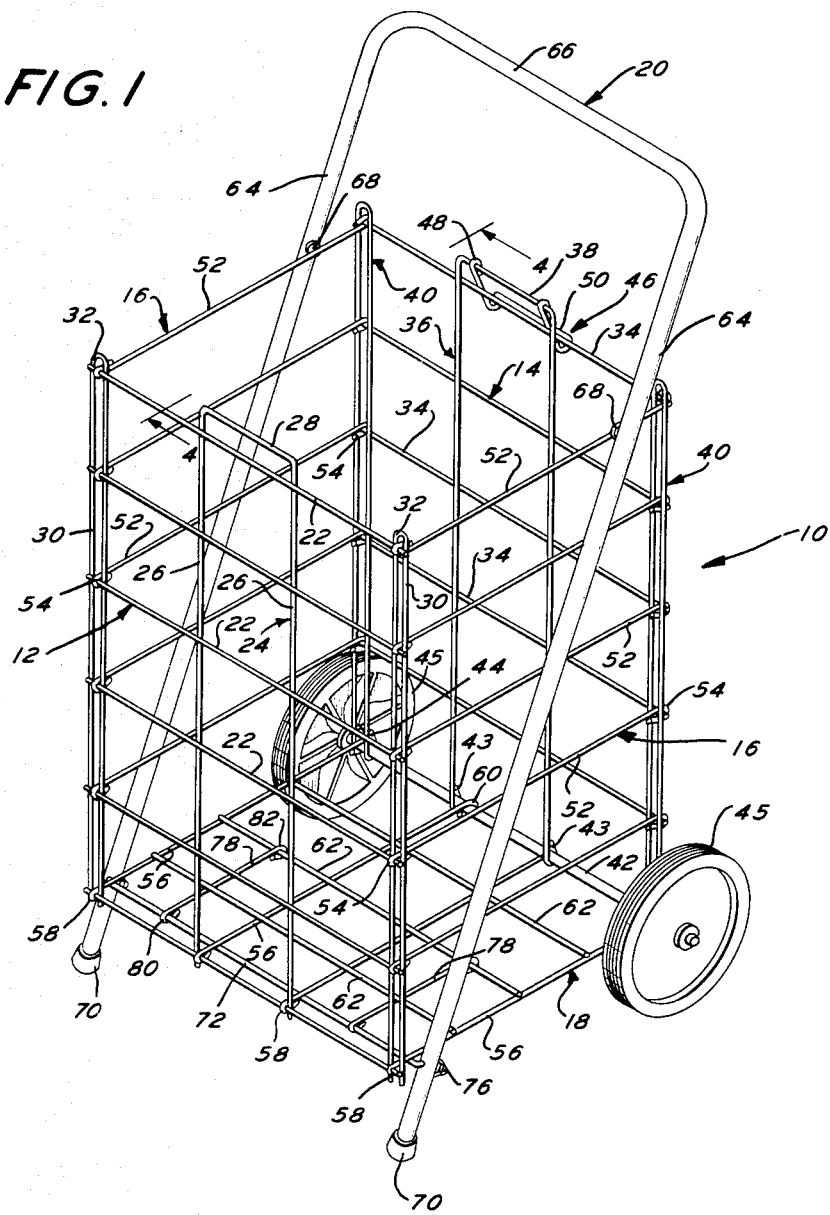

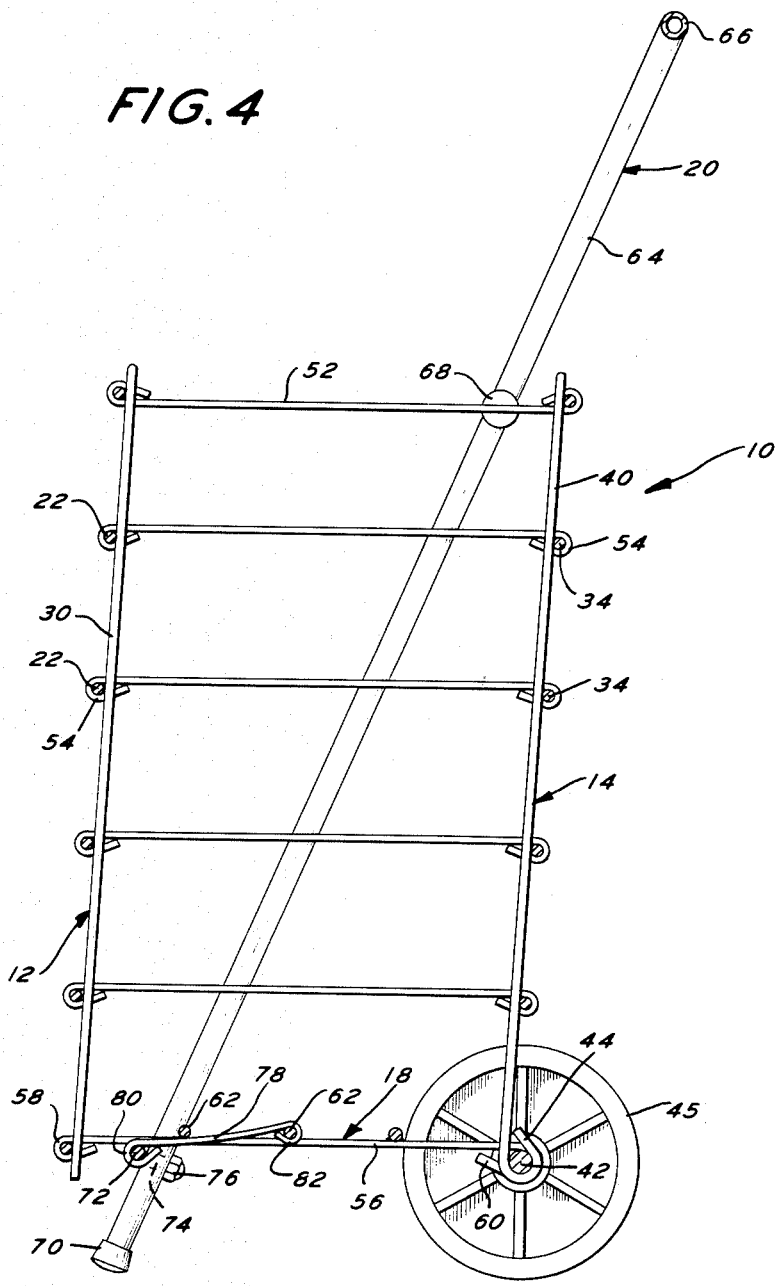

United States Patent Office 3,236,536
Patented Feb. 22, 1966

3,236,536
SHOPPING CART
Charles Shore, 7501 Rowland Ave., Cheltenham, Pa.
Filed Apr. 17, 1964, Ser. No. 360,498
3 Claims. (Cl. 280—36)

This invention relates to a shopping cart. More particularly, it relates to a shopping cart of the type having front and rear rectangular sections which are pivotable in parallel planes to collapse the cart.

Shopping carts of this general type are now in common usage. Basically these shopping carts comprise a rectangular front section and a rectangular rear section which are hinged together by pivotal means whereby they may be pivoted toward each other in parallel planes around these pivotal means. A U-shaped handle is provided which is pivotally secured to the sides of the shopping cart and projects below the bottom of the shopping cart. Loops are secured to the bottom of the cart and slidably engage the legs of the U-shaped handle. Therefore, the cart is collapsed by the pivoting of the side around its pivotal connection with the U-shaped handle and the sliding of the loops along the legs of the handle.

The shopping cart of this invention also includes the basic structure of the pivotable front and rear sections and the U-shaped handle which is pivotally secured to the sides of the cart. However, the loops which are currently being used are replaced by a pair of links which have one end pivotally secured to a front supporting bar of the cart and the other end pivotally secured to the bottom of the cart. Thus, when collapsing the cart, the pivotal movement is about the sides of the cart and about the links.

There are two advantages obtained by the structure of this invention. The first is that the cart can be collapsed more compactly than that having the loops. The reason for this is that the loops prevent the complete collapse of the front section up against the rear section of the cart. There are no loops to interfere with the collapsing of the cart of this invention.

Another advantage of the structure of the cart of this invention is that there is little danger of breaking the pivoted links at the bottom of the shopping cart. However, there is always the possibility that the loops of the prior shopping cart can be snapped off during the collapsing of the cart. With the loops so removed, the prior cart could not function in its intended manner since the basket of the cart would no longer be held in place when the cart was pulled.

It is therefore an object of this invention to provide a novel shopping cart.

It is another object of this invention to provide a shopping cart which is collapsible to an extremely compact condition.

It is a further object of this invention to provide a shopping cart which can be locked in its collapsed condition and includes frictional means to prevent rolling when collapsed.

These and other objects of this invention are accomplished by providing a shopping cart comprising a front section, a rear section, two side sections, and a bottom section pivotally linking said front and rear sections, said front and rear sections being pivotal toward and away from each other, a U-shaped member having a pair of legs and a bridging section uppermost, said legs being pivotally linked to said side sections and extending downwardly from the back to the front of the cart, a support member bridging the bottom of said legs and secured thereto, and at least one link being pivotally secured to said support member and said bottom section.

Other objects and many of the attendant advantages of this invention will be readily appreciated as the same becomes better understood by reference to the following detailed description when considered in connection with the accompanying drawings wherein:

FIG. 1 is a perspective view of the shopping cart of this invention in its open condition;

FIG. 2 is a side elevational view of the shopping cart of FIG. 1;

FIG. 3 is a side elevational view of the shopping cart of FIG. 1 in its collapsed condition;

FIG. 4 is an enlarged sectional view taken along the line 4—4 of FIG. 1;

FIG. 5 is an enlarged sectional view taken along the line 5—5 of FIG. 2; and

FIG. 6 is an enlarged partial side sectional view of the shopping cart, showing the area indicated at 6 in FIG. 3.

Referring now in greater detail to the various figures of the drawings wherein similar reference characters refer to similar parts, a shopping cart embodying the present invention is generally shown at 10 in FIG. 1. Device 10 basically comprises a front section 12, a rear section 14, two side sections 16, a bottom section 18, and a U-shaped handle 20.

Front section 12 includes a plurality of horizontal rigid wires 22. A U-shaped rigid wire 24 has each of its vertical legs 26 welded to each of the horizontal wires 22. The bridging section 28 of U-shaped wire 24 projects above the uppermost horizontal wire 22, thereby leaving a handle, as will be explained hereinafter. A U-shaped rigid wire 30 is welded to each of the outer ends of horizontal wires 22. Again, the bridging sections 32 are uppermost and project over the top of uppermost horizontal wire 22. The legs of U-shaped wires 30 are spaced a distance which is slightly greater than the diameters of the wires comprising side sections 16.

Back section 14 is similar to front section 12 and includes a plurality of horizontal rigid wires 34. Central U-shaped rigid wire 36 is welded to each of the wires 34 and has bridging section 38 uppermost. Again, bridging section 38 projects above uppermost wire 34. A pair of rigid U-shaped wires 40 are welded to the outer ends of each of the horizontal wires 34. The main distinction in structure between front section 12 and rear section 14 is that the lowermost horizontal wire on rear section 14 is replaced by a horizontal rod 42. The bottoms of the legs of U-shaped wire 36 are looped around rod 42, as shown at 43. Likewise, the bottoms of the legs of U-shaped wires 40 are looped around rod 42, as shown at 44. The purpose of the rod 42 is to serve as an axle for wheels 45 which are rotatably mounted on the ends of the rod.

A locking clamp 46 is pivotally mounted on bridging section 38 of rear section 14. This pivotal mounting is obtained by means of loops 48 formed over bridging section 38. The remainder of clamp 46 is basically U-shaped, with bridging section 50 being hooked, as best seen in FIGS. 1 and 2.

Side sections 16 each comprise a plurality of horizontal rigid wires 52. A loop 54 is provided on the ends of each of the wires 52. The ends of each of the wires 22 and 34 are positioned within the loops 54. As seen in FIG. 1 these loops are maintained between U-shaped wires 30 and 40. As previously pointed out the U-shaped wires 30 and 40 are spaced apart a distance which is slightly greater than the diameters of wires 52.

Bottom section 18 comprises a plurality of longitudinally extending rigid wires 56. The forward ends of wires 56 are looped over lowermost horizontal wire 22 of front section 12, as shown at 58. Outermost loops 58 are positioned between the legs of U-shaped wires 30. The rear ends of wires 56 are looped over axle 42, as shown at 60. Again, the outermost loops 60 are positioned between the legs of U-shaped wires 40. A plurality of rigid wires 62 extend perpendicularly across wires 56 and are welded thereto.

Handle 20 is basically U-shaped and includes legs 64 with bridging section 66 uppermost. The legs 64 are pivotally secured to the sides 16 of the cart. In the embodiment shown, the securement is obtained by welding uppermost wires 52 to bearing disks 68. The bearing disks, in turn, have an integral pin 69 pivotally mounted within tubular leg 64 (see FIG. 5). It is to be understood, of course, that other pivotal securements, such as pivot pins passing through the legs 64 and wires 52, can be used. The legs 64 project downwardly going from the rear to the front of the shopping cart. As seen in FIG. 1, the bottom of the legs are positioned below the bottom section 18 of the shopping cart. The ends of the are closed by frictional caps 70, which may be made of rubber or any frictional plastic well known to the art.

A horizontal rod 72 bridges the bottoms of legs 64. As best seen in FIGS. 2 and 4, rod 72 includes a pair of integral flanges 74 which pass through holes in legs 64. The outer ends of flanges 74 are threaded, and rod 72 is secured on legs 64 by nuts 76 threadedly secured to flanges 74.

A pair of rigid linking wires 78 pivotally connect the bottom section 18 of the shopping cart to rod 72. Thus each wire 78 has a forward end 80 which is looped over supporting rod 72 and a rear end 82 which is looped over the central transverse wire 62 of bottom section 18. In this way, wires 78 are pivotally connected to the supporting rod and the bottom section.

The shopping cart of this invention is used for transporting packages in the position shown in FIGS. 1 and 2. Thus after packages have been placed in the cart, the handle 20 is tilted backwardly in the direction of arrow 84 (FIG. 2) and the user can then pull the cart when in this position. As seen in FIG. 2, when the handle is tilted the cart will be resting solely on wheels 45. The weight of the cart against the wheels tends to force the back section 14 of the cart upward, as shown by arrow 86 in FIG. 2. Since the side sections 16 of the cart are pivotally linked to rear section 14 by hooks 54 and are pivotal around handle 20 at bearing disks 68, the forward portions of wires 52 will be forced downwardly. Likewise, front section 12 of the cart will be forced downwardly by wires 52. The downward movement of the front of the cart is limited by bottom section 18 abutting rod 72. The maintaining of the cart in the position shown in FIGS. 1 and 2 is accomplished by wires 78 which pivotally link bottom section 18 and rod 72.

It is thus seen with the cart in the open position of FIGS. 1 and 2, the cart can easily be pulled regardless of whether any packages are placed therein. This is because the mere weight of the cart against the wheels 45 when the cart is pulled will always maintain the cart in the open position.

Another feature of this invention is the fact that additional support for the cart in the open position is effectuated by wires 78. Thus, as seen in FIG. 4, the forwardmost wire 62 of bottom section 18 bears against the tops of pivot wires 78. Thus these pivot wires provide additional support for the cart.

Closing of the cart is easily accomplished by grasping the handle provided by bridging section 28 (FIG. 1) and raising it. When this is done, front section 12 and rear section 14 will approach each other in parallel planes. Side sections 16 will be pivoted through their respective vertical planes. The pivotal movement is accomplished since side sections 16 are pivotally connected to front section 12 and rear section 14 through loops 54. Pivot links 78 in combination with pivot disks 68 limit the arc of rotation of front section 12 relative to rear section 14. When the front section 12 is completely raised, it will be in a vertical plane and substantially abutting rear section 14 (see FIG. 3). It should also be noted that wheels 45 are outwardly spaced from side sections 16 in order to permit legs 64 to pass them in collapsing the cart to the position shown in FIG. 3.

One advantage of the shopping cart of this invention over the prior carts embodying loops which slidably engage a handle similar to handle 20 is that the cart of this invention can be collapsed to a more compact condition than that of the prior art. This is because the loops of the prior carts will constantly engage the U-shaped handle thereby preventing the collapsing of the cart to an area between the legs of the handle. Having the cart in the more compact condition when collapsed facilitates both shipping by the manufacturer and storage by the user.

Once the cart has been collapsed to the position shown in FIG. 3, it is maintained in this collapsed condition by rotating locking clamp 46 counterclockwise around bridging section 38 and looping the hooked forward portion 50 over one of the horizontal wires 22 of front section 12 (FIG. 6). It should also be noted that during the collapsing of the cart the weight of the cart is transferred from wheels 45 to legs 64 of the handle by rotating the handle forward to a substantially vertical position, as seen in FIG. 3. With the cart in this condition it can easily be stored by leaning it against a vertical surface, such as a wall. The frictional caps 70 prevent the cart from sliding away from the vertical surface.

When it is desired to open the cart again for use or movement, locking means 46 are removed from horizontal wire 22 and pivoted clockwise to the position shown in FIG. 2. The handle of the cart 20 is again rotated clockwise until the cart rests on wheels 45. This automatically causes the pivoting of front section 12 away from rear section 14 thereby opening the cart. The cart can then be moved about by pulling it in the manner described above.

Obviously many modifications and variations of the present invention are possible in the light of the above teachings. It is, therefore, to be understood that within the scope of the appended claims, the invention may be practiced otherwise than as specifically described.

What is claimed as the invention is:

1. A shopping cart comprising a front section, a rear section, two side sections, and a bottom section pivotally linking said front and rear sections, said front and rear sections being pivotal toward and away from each other, a U-shaped member having a pair of legs and a bridging section uppermost, said legs being pivotally linked to said side sections and extending downwardly from the back to the front of the cart, a support member bridging the bottoms of said legs and secured thereto, and at least one link pivotally secured to said support member and said bottom section for maintaining the cart in an open position.

2. The shopping cart of claim 1 wherein said bottom section includes at least one transverse wire with said link being pivotally secured to said transverse wire.

3. The shopping cart of claim 1 wherein a pair of links are provided.

References Cited by the Examiner

UNITED STATES PATENTS

| | | | |
|---|---|---|---|
| 2,823,043 | 2/1958 | Shone | 280—36 |
| 2,920,900 | 1/1960 | Best | 280—36 |

ARTHUR L. LA POINT, *Primary Examiner.*